United States Patent
Ahn

(10) Patent No.: US 10,124,450 B2
(45) Date of Patent: Nov. 13, 2018

(54) ROTATION PART OF ROTARY MACHINE AND METHOD OF MANUFACTURING THE SAME

(71) Applicant: HANWHA TECHWIN CO., LTD., Changwon-si (KR)

(72) Inventor: Jongkee Ahn, Changwon-si (KR)

(73) Assignee: HANWHA AEROSPACE CO., LTD., Changwon-si (KR)

( * ) Notice: Subject to any disclaimer, the term of this patent is extended or adjusted under 35 U.S.C. 154(b) by 675 days.

(21) Appl. No.: 14/557,892

(22) Filed: Dec. 2, 2014

(65) Prior Publication Data
US 2016/0001406 A1   Jan. 7, 2016

(30) Foreign Application Priority Data
Jul. 7, 2014   (KR) .................. 10-2014-0084624

(51) Int. Cl.
*B23P 15/00* (2006.01)
*F04D 29/28* (2006.01)
(Continued)

(52) U.S. Cl.
CPC .......... *B23P 15/006* (2013.01); *B23K 1/0018* (2013.01); *B23K 5/06* (2013.01);
(Continued)

(58) Field of Classification Search
CPC ....... B23P 15/06; B23K 10/02; B23K 9/0026; B23K 26/32; B23K 26/144; B23K 26/26;
(Continued)

(56) References Cited

U.S. PATENT DOCUMENTS 2,396,488 A * 3/1946 Bolas ................. B23C 3/18
409/102
2,480,807 A * 8/1949 De Vlieg ............ B23C 3/18
29/23.51
(Continued)

FOREIGN PATENT DOCUMENTS

CN 101946067 A 1/2011
CN 102741007 A 10/2012
(Continued)

OTHER PUBLICATIONS

Communication dated Aug. 7, 2018 issued by Chinese Intellectual Property Office in counterpart Chinese Application No. 201510390823.4.

*Primary Examiner* — Jacob Cigna
(74) *Attorney, Agent, or Firm* — Sughrue Mion, PLLC

(57) ABSTRACT

There is provided a rotation part of a rotary machine, the rotation part including: a base unit including a surface constituting fluid channels; a plurality of blade units protruding from the base unit; a plurality of shroud segment support units connected to the plurality of blade units and extending in a parallel direction to the surface of the base unit; a shroud segment disposed between and bonded to adjacent shroud segment support units of the plurality of shroud segment support units; and a first reinforcing unit provided on an intersection portion between a blade unit of the plurality of blade units and a shroud segment support unit of the plurality of shroud segment support units, wherein a distance from a protruding direction center line of the blade unit to an end portion of the shroud segment support unit is greater than a maximum distance from the protruding direction center line of the blade unit to an end portion of the first reinforcing unit.

13 Claims, 14 Drawing Sheets

(51) Int. Cl.

| | | |
|---|---|---|
| *F04D 29/02* | (2006.01) | |
| *F04D 29/22* | (2006.01) | |
| *B23K 1/00* | (2006.01) | |
| *B23K 5/06* | (2006.01) | |
| *B23K 5/12* | (2006.01) | |
| *B23K 9/00* | (2006.01) | |
| *B23K 9/16* | (2006.01) | |
| *B23K 9/23* | (2006.01) | |
| *B23K 10/02* | (2006.01) | |
| *B23K 11/00* | (2006.01) | |
| *B23K 15/00* | (2006.01) | |
| *B23K 26/26* | (2014.01) | |
| *B23K 26/32* | (2014.01) | |
| *B23K 26/144* | (2014.01) | |
| *B23K 26/211* | (2014.01) | |
| *B23K 101/00* | (2006.01) | |
| *B23K 103/04* | (2006.01) | |

(52) U.S. Cl.
CPC ............ *B23K 5/12* (2013.01); *B23K 9/0026* (2013.01); *B23K 9/16* (2013.01); *B23K 9/23* (2013.01); *B23K 10/02* (2013.01); *B23K 11/002* (2013.01); *B23K 15/0093* (2013.01); *B23K 26/144* (2015.10); *B23K 26/211* (2015.10); *B23K 26/26* (2013.01); *B23K 26/32* (2013.01); *F04D 29/023* (2013.01); *F04D 29/2227* (2013.01); *F04D 29/284* (2013.01); *B23K 2201/001* (2013.01); *B23K 2203/04* (2013.01); *F05D 2230/10* (2013.01); *F05D 2230/232* (2013.01); *F05D 2300/171* (2013.01)

(58) Field of Classification Search
CPC ........ B23K 9/16; B23K 9/23; B23K 15/0093; B23K 26/211; B23K 1/0018; B23K 11/002; B23K 5/12; B23K 5/06; F04D 29/2227; F04D 29/284; F04D 29/28; F05D 2230/10; F05D 2300/171; F01D 5/043

See application file for complete search history.

(56) References Cited

U.S. PATENT DOCUMENTS

| | | | | |
|---|---|---|---|---|
| 2,625,365 | A * | 1/1953 | Moore | F01D 5/043 228/182 |
| 2,962,941 | A * | 12/1960 | Stein | B23C 3/18 29/23.51 |
| 7,305,762 | B2 * | 12/2007 | Mola | B23C 3/18 29/557 |
| 7,371,046 | B2 * | 5/2008 | Lee | F01D 5/143 415/191 |
| 8,206,095 | B2 * | 6/2012 | Parker | F01D 5/14 415/191 |
| 8,581,136 | B2 * | 11/2013 | Kishimoto | B23H 9/00 219/69.17 |
| 9,175,662 | B2 * | 11/2015 | Bouvet | F03B 3/125 |
| 9,441,491 | B2 * | 9/2016 | Kim | F04D 29/284 |
| 2006/0280609 | A1 * | 12/2006 | Ranz | B23P 15/006 416/182 |
| 2009/0095719 | A1 * | 4/2009 | Tsukamoto | B23K 26/28 219/121.63 |
| 2010/0316502 | A1 * | 12/2010 | Khanhson | B23H 9/00 416/90 R |
| 2011/0108526 | A1 * | 5/2011 | Kishimoto | B23H 9/00 219/69.17 |
| 2011/0206518 | A1 * | 8/2011 | Bouvet | F03B 3/125 416/185 |
| 2011/0318183 | A1 | 12/2011 | Noronha et al. | |
| 2013/0078099 | A1 * | 3/2013 | Ahn | B23K 1/0008 416/182 |

FOREIGN PATENT DOCUMENTS

| | | |
|---|---|---|
| JP | 08-159088 A | 6/1996 |
| JP | H11148496 A | 6/1999 |
| JP | 2002364588 A * | 12/2002 |
| KR | 10-2012-0075187 A | 7/2012 |
| WO | 2014098417 A1 | 6/2014 |

* cited by examiner

ROTATION PART OF ROTARY MACHINE AND METHOD OF MANUFACTURING THE SAME

CROSS-REFERENCE TO RELATED APPLICATION

This application claims priority from Korean Patent Application No. 10-2014-0084624, filed on Jul. 7, 2014, in the Korean Intellectual Property Office, the disclosure of which is incorporated herein by reference in its entirety.

BACKGROUND

1. Field

Apparatuses and methods consistent with exemplary embodiments relate to a rotation part of a rotary machine and a method of manufacturing the rotation part, and more particularly, to a rotation part of a rotary machine such as a compressor or a pump, and a method of manufacturing the rotation part.

2. Description of the Related Art

A compressor or a pump is a rotary machine in which the main element is a rotation part.

In the related art, a rotary machine includes an impeller, that is, a rotation part, which increases the pressure of a fluid by transferring rotational kinetic energy to the fluid. For the transfer of the rotational kinetic energy, the impeller includes a plurality of blades for guiding the flow of the fluid and transferring rotational kinetic energy to the fluid.

A shroud is disposed outside the impeller and forms fluid passages together with the blades.

Since the efficiency of a compressor mostly increases with the reduction of the gap between blades and a shroud, in the related art, a method of maximizing the efficiency of a compressor by combining a shroud with the blades of an impeller has been suggested.

For example, Korea Patent Publication No. 2011-0080889 discloses a fixing method in which blades and shroud are bonded by welding.

SUMMARY

One or more embodiments include a rotation part having excellent strength, and a method of manufacturing the rotation part.

According to an aspect of an exemplary embodiment, there is provided a rotation part of a rotary machine, the rotation part including: a base unit including a surface constituting fluid channels; a plurality of blade units protruding from the base unit; a plurality of shroud segment support units connected to the plurality of blade units and extending in a parallel direction to the surface of the base unit; a shroud segment disposed between and bonded to adjacent shroud segment support units of the plurality of shroud segment support units; and a first reinforcing unit provided on an intersection portion between a blade unit of the plurality of blade units and a shroud segment support unit of the plurality of shroud segment support units, wherein a distance from a protruding direction center line of the blade unit to an end portion of the shroud segment support unit is greater than a maximum distance from the protruding direction center line of the blade unit to an end portion of the first reinforcing unit.

A first step structure may be provided in the plurality of shroud segment support units, and a second step structure may be provided in the shroud segment and be connected to the first step structure.

A second reinforcing unit may be provided on an intersection portion between the base unit and the blade unit.

A distance difference between the distance from the protruding direction center line of the blade unit to the end portion of the shroud segment support unit and the maximum distance from the protruding direction center line of the blade unit to the end portion of the first reinforcing unit may be sufficient to prevent the first reinforcing unit from being thermally affected during the bonding the shroud segment and the adjacent shroud segment support units.

According to another aspect of an exemplary embodiment, there is provided a method of manufacturing a rotation part of a rotary machine, the method including: preparing a raw material member; processing the raw material member to form a base unit having a surface constituting fluid channels, a plurality of blade units protruding from the base unit, and a plurality of shroud segment support units connected to the plurality of blade units and extending in a parallel direction to the surface of the base unit; placing a shroud segment between adjacent shroud segment support units of the plurality of shroud segment support units; and bonding the shroud segment and the adjacent shroud segment support units.

The rotary machine may be a compressor or a pump.

The raw material member may have a cylindrical shape.

The raw material member may include forging steel.

The processing may be at least one of cutting processing, grinding processing and laser processing.

The cutting processing may be end mill processing.

The processing the raw material member may include forming a first reinforcing unit on an intersection portion between the plurality of blade units and the plurality of shroud segment support units.

The forming the first reinforcing unit may include forming a surface of the first reinforcing unit with a curved shape.

The forming the first reinforcing unit may include forming the first reinforcing unit having a cross section of a triangular shape.

A distance from a protruding direction center line of a blade unit of the plurality of blade units to an end portion of a shroud segment support unit of the plurality of shroud segment support units is greater than a maximum distance from the protruding direction center line of the blade unit to an end portion of the first reinforcing unit.

The processing the raw material member may include forming a second reinforcing unit on an intersection portion between the base unit and the plurality of blade units.

The processing the raw material member may include forming a first step structure in the plurality of shroud segment support units, and the method may further include forming a second step structure in the shroud segment, the second step structure connected to the first step structure.

Each of the first step structure and the second step structure may include a plurality of steps.

The bonding of the plurality of shroud segment support units and the shroud segment may include at least one of laser welding, electron beam welding, arc welding, gas welding, resistance welding and brazing.

The method may further include, after the bonding, performing cutting processing or grinding processing on a bonding part of the plurality of shroud segment support units and the shroud segment.

BRIEF DESCRIPTION OF THE DRAWINGS

The above and/or other aspects will become apparent and more readily appreciated from the following description of exemplary embodiments, taken in conjunction with the accompanying drawings in which.

DETAILED DESCRIPTION

Figure 1:
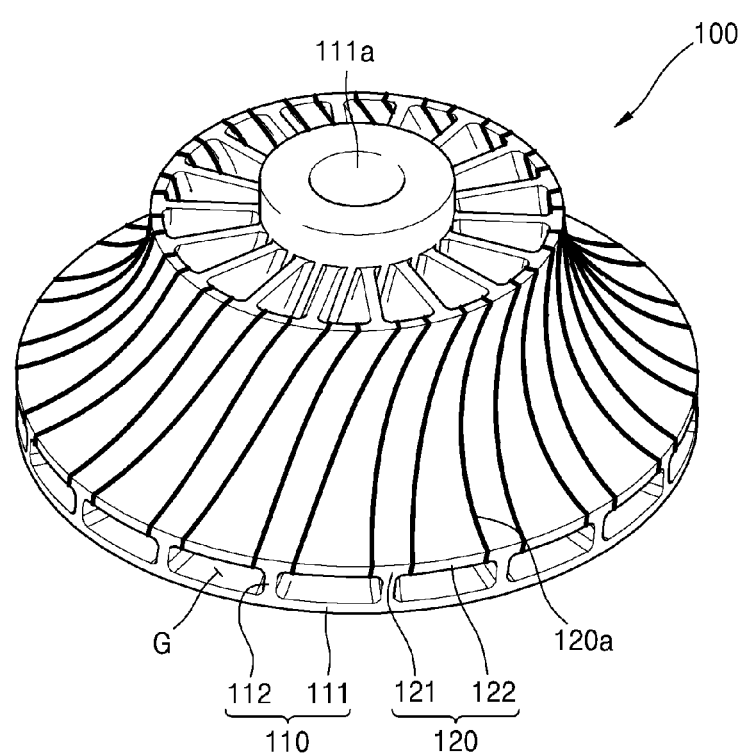
FIG. 1 is a schematic perspective view of a rotation part of a rotary machine according to an exemplary embodiment.

Reference will now be made in detail to exemplary embodiments, examples of which are illustrated in the accompanying drawings, wherein like reference numerals refer to like elements throughout, and thus, repeated descriptions will be omitted. In this regard, the exemplary embodiments may have different forms and should not be construed as being limited to the descriptions set forth herein. Accordingly, the exemplary embodiments are merely described below, by referring to the figures, to explain aspects of the present description.

Figure 2:
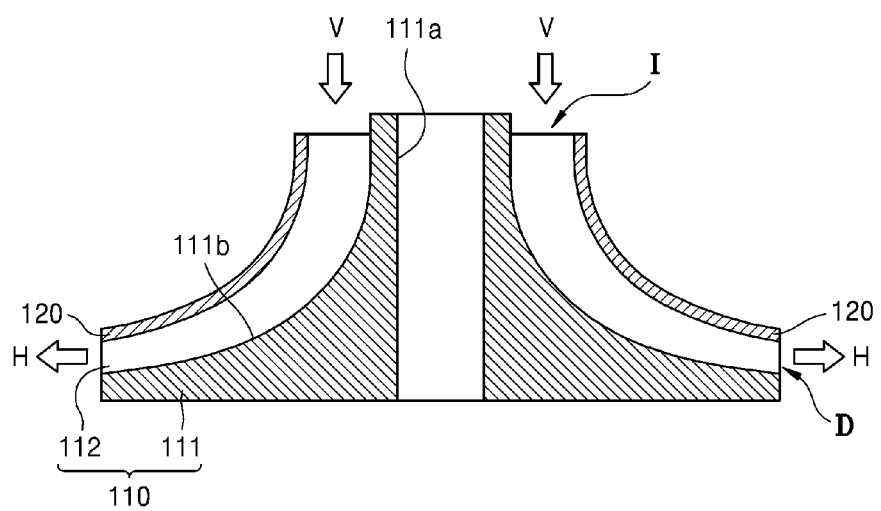
FIG. 2 is a cross-sectional view of the rotation part of the rotary machine of FIG. 1 according to an exemplary embodiment.

FIG. 1 is a schematic perspective view of a rotation part 100 of a rotary machine according to an exemplary embodiment. FIG. 2 is a cross-sectional view of the rotation part 100 of the rotary machine of FIG. 1.

The rotary machine according to the exemplary embodiment is a compressor, and as illustrated in FIGS. 1 and 2, the rotation part 100 of the rotary machine includes an impeller 110 and a shroud 120.

The rotary machine according to the exemplary embodiment is a compressor, but the exemplary embodiment is not limited thereto. Specifically, the rotary machine may be any device capable of changing a pressure and speed of a fluid by a rotary motion of the rotation part. For example, the rotary machine may be a pump or an air blower.

The impeller 110 includes a base unit 111 and a plurality of blade units 112.

A mounting hole 111a is provided in the radial center of the base unit 111. Since a rotation shaft (not shown) is fitted into the mounting hole 111a in an assembling process, power is transferred from the rotation shaft to the impeller 110.

Since a surface 111b of the base unit 111 is inclined and curved to form bottom surfaces of fluid channels G, a fluid may flow smoothly and maximum energy may be transferred to the fluid.

The plurality of blade units 112 protrude from the base unit 111, guide the flow of the fluid, and transfer kinetic energy of the impeller 110 to the fluid.

Meanwhile, the shroud 120 is formed by bonding a shroud segment support unit 121 and a shroud segment 122. After the shroud segment support unit 121 and the shroud segment 122 are bonded, a bonding line portion 120a is formed.

The shroud segment support unit 121 and the shroud segment 122 of shroud 120 form ceiling surfaces of the fluid channels G, and also form passages of the fluid together with the base unit 111 and the blade units 112.

A process of transferring energy to the fluid due to a rotary motion of the above-described rotation part 100 will now be described.

When the rotation shaft rotates, the impeller 110 and the shroud 120 also rotate.

The fluid flows into inlets I of the rotation part 100 in the directions indicated by vertical arrows V in FIG. 2, receives rotational kinetic energy of the rotation part 100, and then flows out of outlets D in a high-pressure state in the direction indicated by horizontal arrows H in FIG. 2. After that, the fluid passes through a diffuser (not shown) in which the fluid speed is reduced and the fluid pressure is increased to a desired level. A detailed description of the diffuser is omitted.

A method of manufacturing the rotation part 100 according to an exemplary embodiment will now be described with reference to FIGS. 3 through 11 below.

Figure 3:
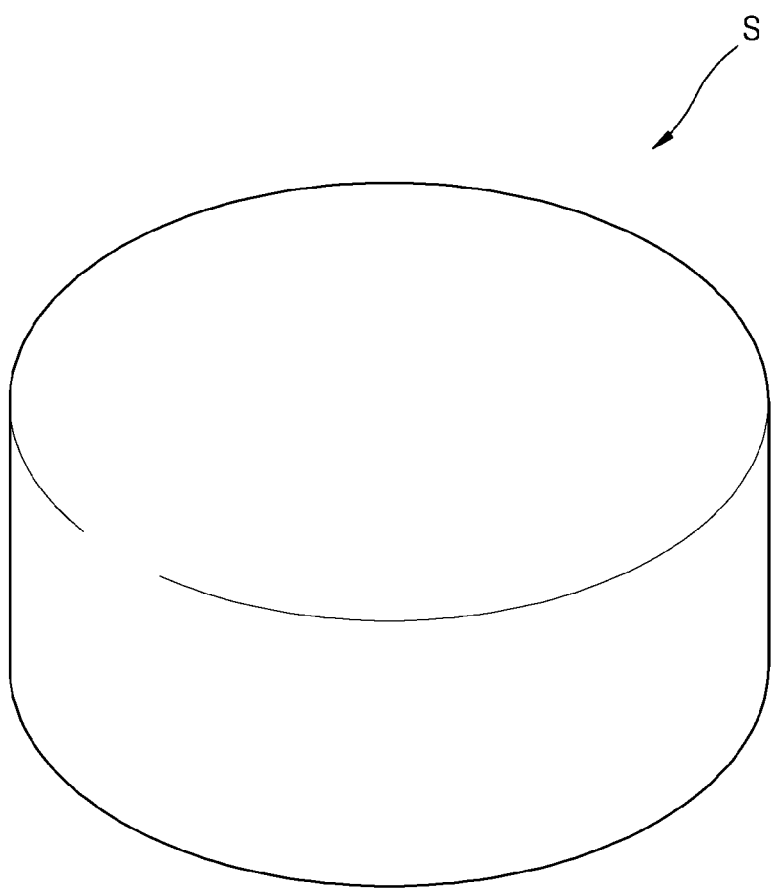
FIG. 3 is a schematic perspective view of a raw material member according to an exemplary embodiment.
Figure 4:
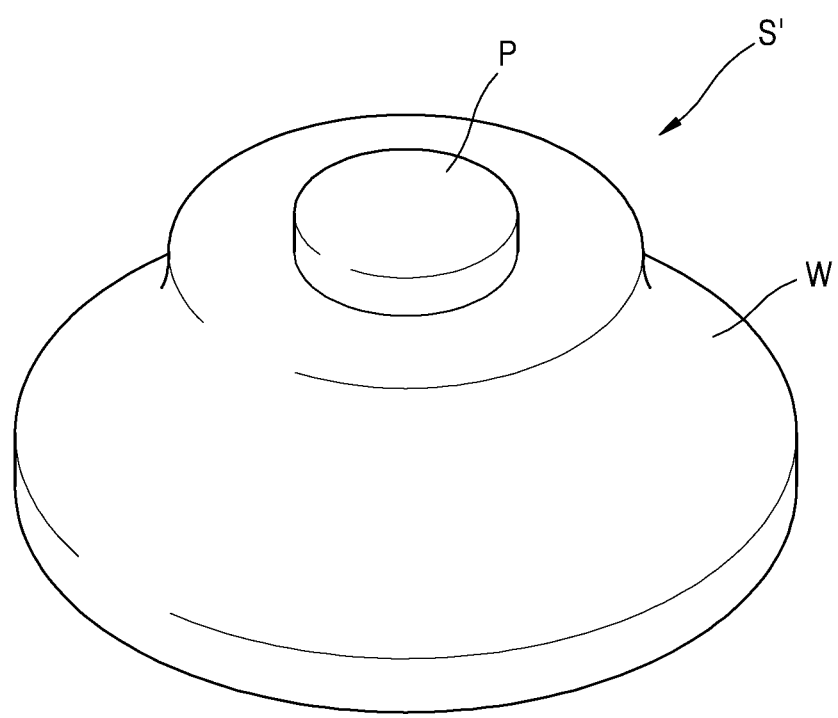
FIG. 4 is a schematic perspective view of a raw material member undergoing first cutting processing according to an exemplary embodiment.
Figure 5:
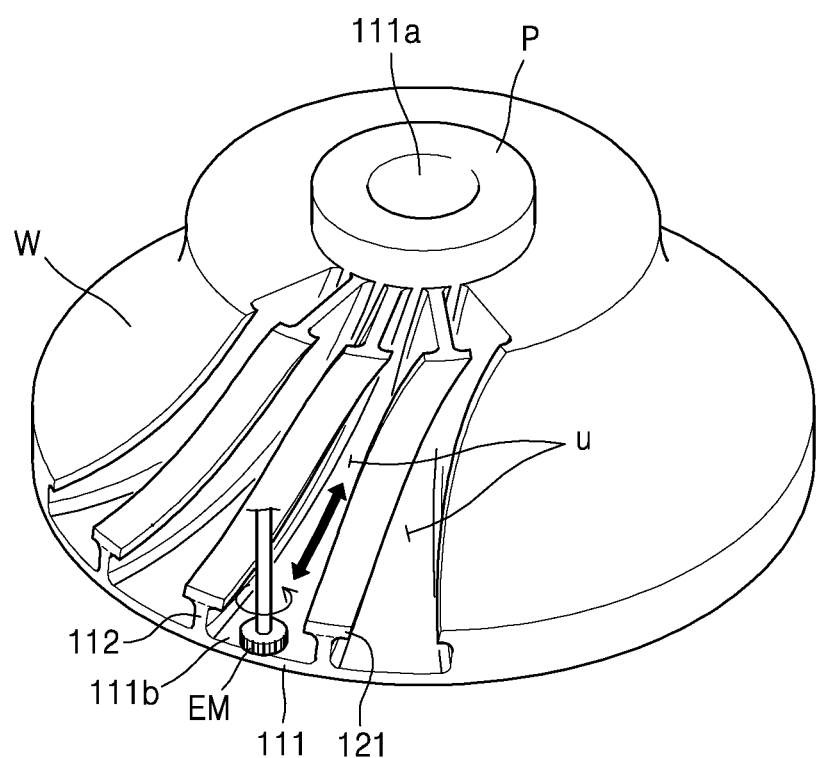
FIG. 5 is a schematic perspective view of a raw material member undergoing second cutting processing according to an exemplary embodiment.
Figure 6:
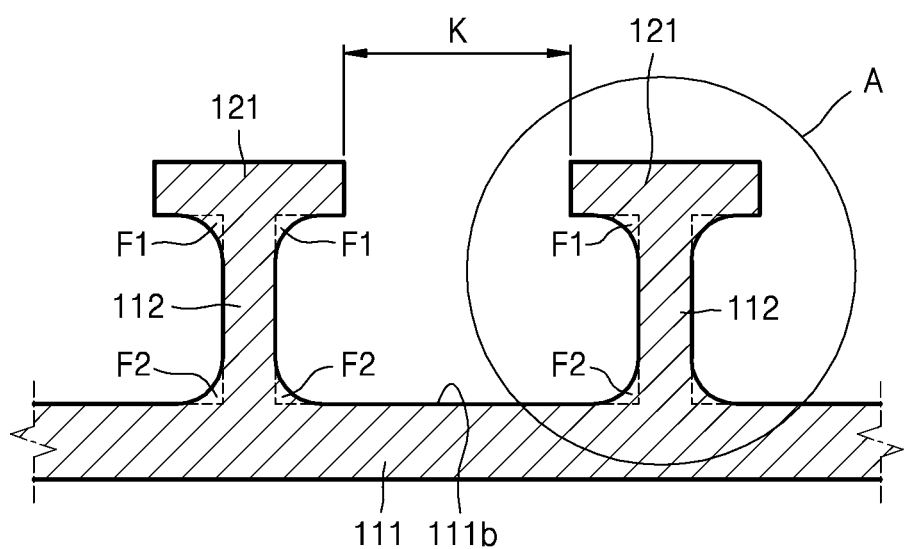
FIG. 6 is a schematic cross-sectional view of a raw material member after the first and second cutting processing is completed according to an exemplary embodiment.
Figure 7:
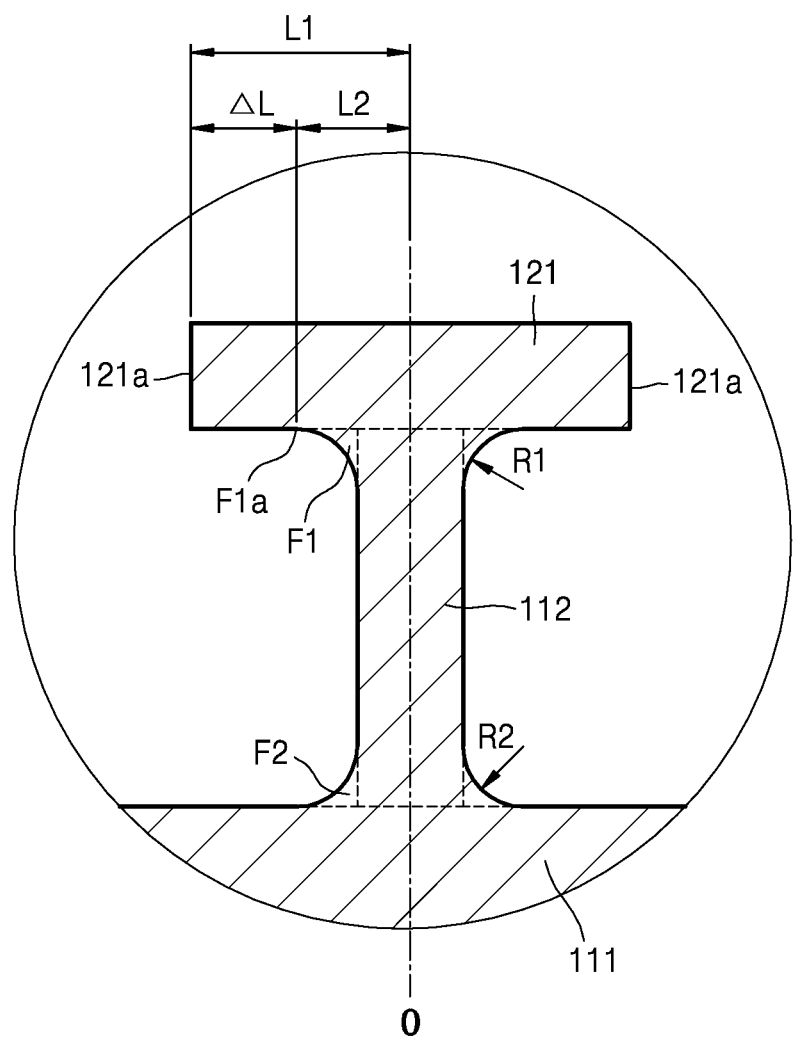
FIG. 7 is a magnified cross-sectional view of portion A illustrated in FIG. 6 according to an exemplary embodiment.
Figure 8:
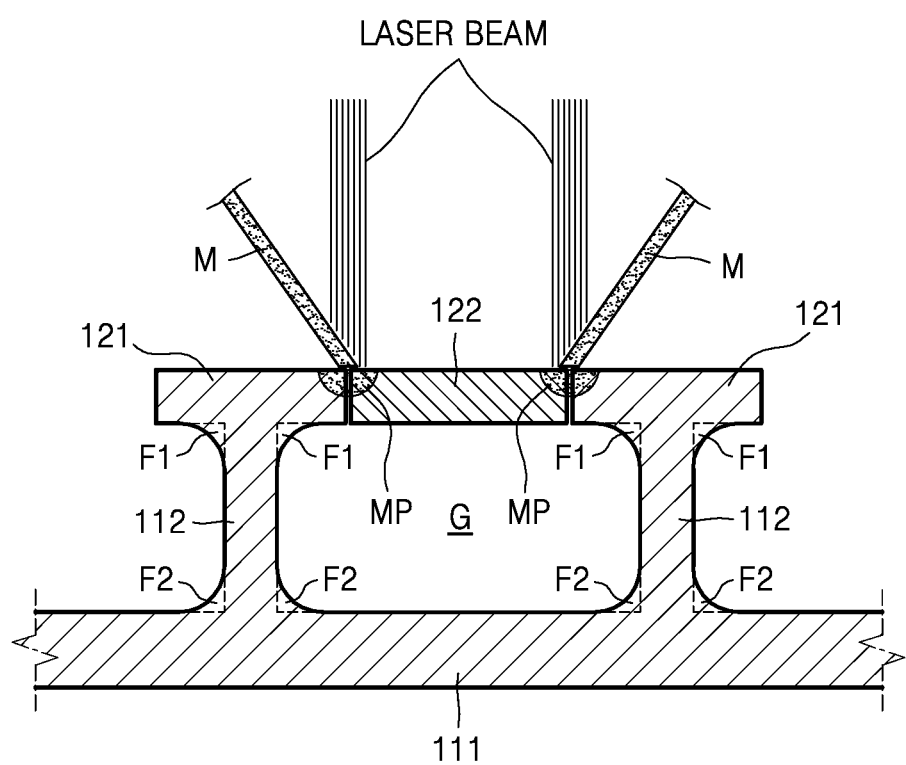
FIGS. 8 and 9 are schematic cross-sectional views for illustrating a process of bonding a shroud segment to shroud segment support units according to an exemplary embodiment.
Figure 9:
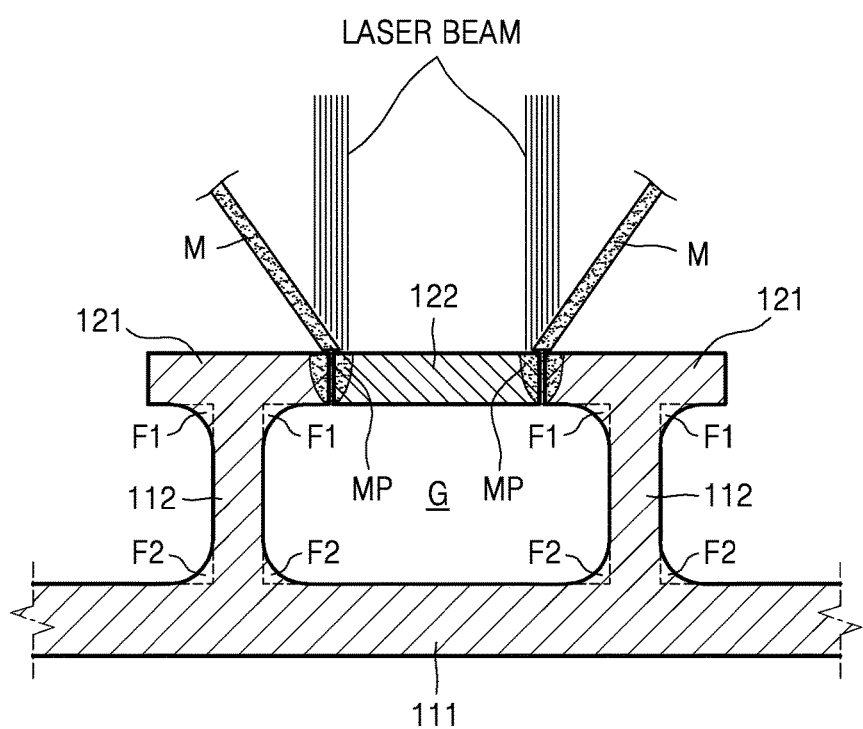
Figure 10:
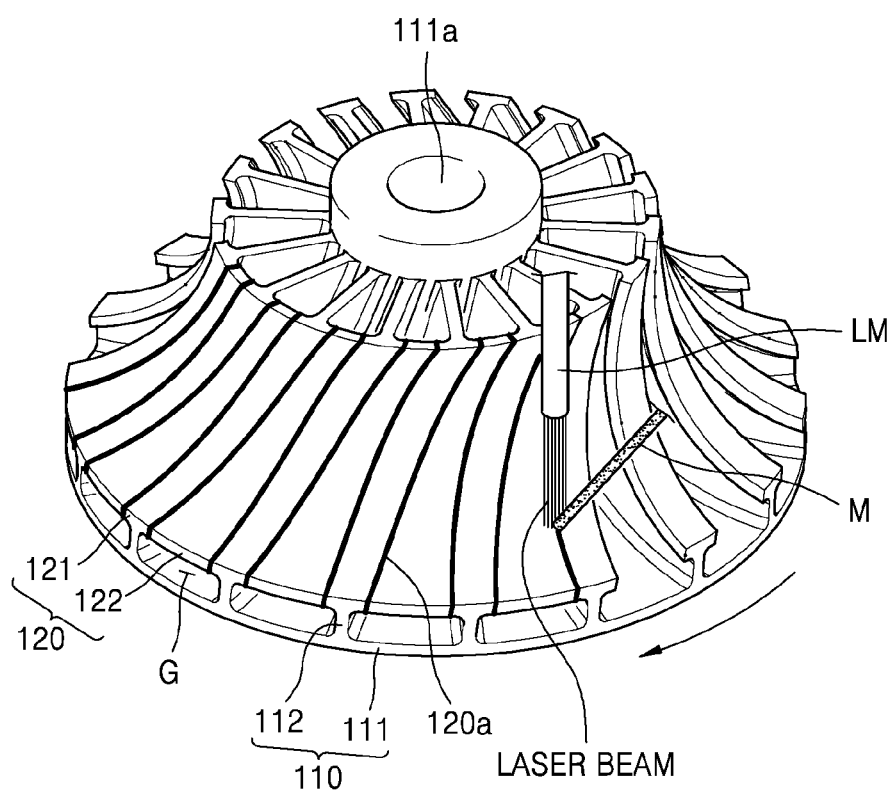
FIG. 10 is a schematic perspective view for illustrating a process of bonding a shroud segment to a shroud segment support unit according to an exemplary embodiment.
Figure 11:
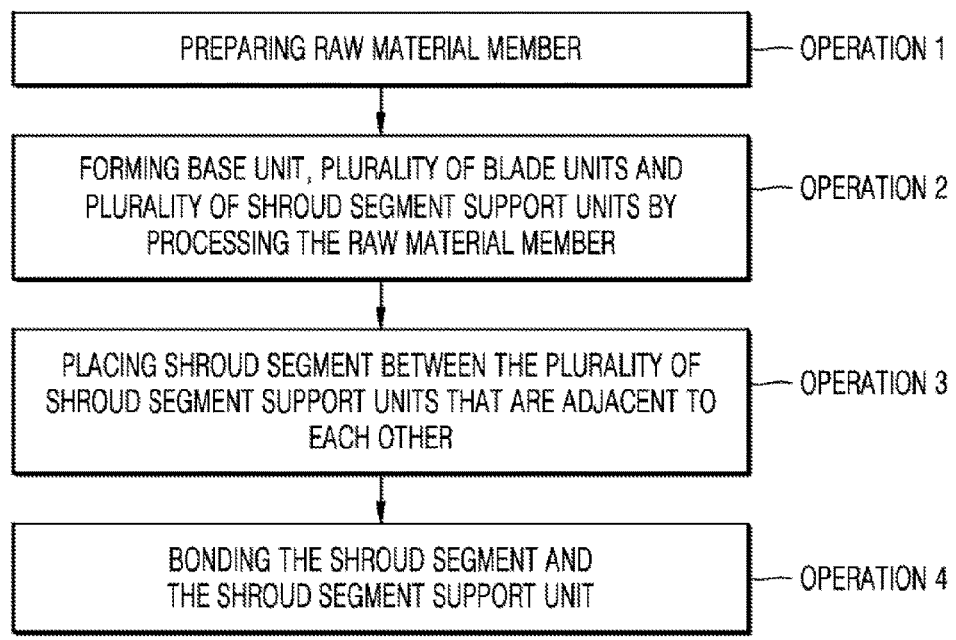
FIG. 11 is a flowchart illustrating a process of manufacturing a rotation part according to an exemplary embodiment.

FIG. 3 is a schematic perspective view of a raw material member S according to an exemplary embodiment. FIG. 4 is a schematic perspective view of a raw material member undergoing first cutting processing according to an exemplary embodiment. FIG. 5 is a schematic perspective view of a raw material member undergoing second cutting processing according to an exemplary embodiment. FIG. 6 is a schematic cross-sectional view of a raw material member after the first and second cutting processing is completed according to an exemplary embodiment. FIG. 7 is a magnified cross-sectional view of portion A illustrated in FIG. 6 according to an exemplary embodiment. FIGS. 8 and 9 are schematic cross-sectional views for illustrating a process of bonding a shroud segment 122 to shroud segment support units 121 according to an exemplary embodiment. FIG. 10 is a schematic perspective view for illustrating a process of bonding a shroud segment 122 to a shroud segment support unit 121 according to an exemplary embodiment. FIG. 11 is a flowchart illustrating a process of manufacturing a rotation part 100 according to an exemplary embodiment.

Referring now to FIG. 11 illustrating the process of manufacturing the rotation part 100, a manufacturer initially prepares the raw material member S (operation 1) as shown in FIG. 3. In the manufacturing process as illustrated in FIG. 11, the raw material member S is a material for forming the base unit 111, the plurality of blade units 112 and the shroud segment support unit 121.

The raw material member S has a cylindrical shape and is made up of a forging steel material in order to manufacture the rotation part 100 having high strength.

The raw material member S according to the exemplary embodiment has initially a cylindrical shape for simple processing and preparation, but the exemplary embodiment is not limited thereto. That is, there is no special limitation on the initial shape of the raw material member S according to the exemplary embodiment. For example, when the raw material member S according to the exemplary embodiment is formed by casting, die casting, injection molding, etc., the raw material member S may have the initial shape as shown in FIG. 4, rather than the cylindrical shape of FIG. 3.

The material of the raw material member S according to the exemplary embodiment is made up of forging steel, but the exemplary embodiment is not limited thereto. That is, there is no special limitation on the material of the raw material member S. For example, the raw material member S according to the exemplary embodiment may be made of various materials such as metal, wood, synthetic resin, etc.

Thereafter, a worker of the manufacturer processes the raw material member S for forming the base unit 111, the plurality of blade units 112 and the shroud segment support unit 121 (operation 2). A processing method of the exemplary embodiment is cutting processing that is divided into the first cutting processing and second cutting processing for convenience of explanation.

Initially, the worker performs the first cutting processing to modify the cylindrical shape of the raw material member S into the shape of FIG. 4. In this case, in the first cutting processing, an external surface of the raw material member S is modified by lathe processing. A shape of a raw material member S' of FIG. 4 may have an upper part P and an intermediate part W that are obtained from the first cutting processing.

Subsequently, as shown in FIG. 5, the worker performs the second cutting processing on the raw material member S' of FIG. 4. Specifically, the mounting hole 111a is formed in the upper part P via a drilling process, and the bottom surface 111b of fluid channels, the blade units 112, and the shroud segment support unit 121 are formed in the intermediate part W via a planning process or a milling process.

In particular, when the second cutting processing is performed via the milling process, an end mill EM may be used as a cutting tool. FIG. 5 shows a cutting process performed by using the end mill EM.

If an opening part U is formed in the intermediate part W via processing during a cutting process, various cutting tools may be further used through the opening part U. In doing so, precise processing for the surface 111b, the blade units 112, and the shroud segment support unit 121 may be performed, and processing may be performed on a first reinforcing unit F1 and a second reinforcing unit F2 that will be described later with precise dimension as shown in FIG. 6.

According to the exemplary embodiment, the cutting processing regarding the raw material member S is performed in two separate processes, but the exemplary embodiment is not limited thereto. That is, the cutting processing for the raw material member S according to the exemplary embodiment may be optionally divided into three or more operations, and there is no special limitation on the number and methods of performing the cutting processing.

The raw material member S according to the exemplary embodiment may be processed via the cutting processing by using any tool having a greater hardness than that of the raw material member S. That is, there is no special limitation on the method of processing the raw material member S according to the exemplary embodiment. For example, the processing with respect to the raw material member S according to the exemplary embodiment may include abrasive processing, grinding processing, laser processing, etc.

FIGS. 6 and 7 are cross-sectional views of the base unit 111, the blade units 112, and the shroud segment support unit 121 that are formed through the cutting processing of the raw material member S described above.

As described above, the base unit 111, the plurality of blade units 112, and the shroud segment support unit 121 are formed by performing the cutting processing on the raw material member S, and thus it is necessary to identify a location of each part for explanation.

That is, each part is identified via a dotted line in FIGS. 6 and 7. The base unit 111 is located in a lowermost part. The plurality of blade units 112 protrude from the base unit 111 upward. The surface 111b of the base unit 111 forms a surface of the fluid channels G, and the shroud segment support unit 121 is provided on the uppermost parts of the plurality of blade units 112.

The shroud segment support unit 121 is formed to extend in a direction in parallel to the surface 111b of the base unit 111 according to the exemplary embodiment.

The first reinforcing unit F1 is provided at an intersection portion of the blade units 112 and the shroud segment support unit 121 and the second reinforcing unit F2 is provided at an intersection portion of the base unit 111 and the blade units 112.

A surface of the first reinforcing unit F1 has a curved shape with a curvature radius R1. The first reinforcing unit F1 has a function of reinforcing a connection structure of the plurality of blade units 112 and the shroud segment support unit 121 and prevents stress concentration, which is similar to a fillet function in a welding process.

A surface of the second reinforcing unit F2 has a curved shape with a curvature radius R2. The second reinforcing unit F2 has a function of reinforcing a connection structure of the base unit 111 and the plurality of blade units 112 and prevents stress concentration, which is similar to a fillet function in the welding process.

The surfaces of the first reinforcing unit F1 and the second reinforcing unit F2 have curved shapes, but the exemplary embodiment is not limited thereto. That is, the first reinforcing unit F1 and the second reinforcing unit F2 according to the exemplary embodiment may have triangular cross-sections.

Referring to FIG. 7, when a distance from a protrusion direction center line O of the plurality of blade units 112 to an end portion 121a of the shroud segment support unit 121 is L1, and a distance from the protrusion direction center line O of the plurality of blade units 112 to an end portion F1a of the first reinforcing unit F1 is L2, L1 may be greater than L2. A distance difference $\Delta L$ ($\Delta L=L1-L2$) may be sufficiently great such that the first reinforcing unit F1 may not be thermally affected during a bonding process when the shroud segment support unit 121 and the shroud segment 122 are bonded to each other later since the end portion 121a of the shroud segment support unit 121 is bonded to the shroud segment 122. If the first reinforcing unit F1 is thermally affected during the bonding process like welding, a property such as strength is changed, and thus strength of the rotation part 100 generally deteriorates.

Then, as shown in FIGS. 8 and 9, the worker places the shroud segment 122 between the adjacent shroud segment support units 121 (operation 3), and performs the bonding process for bonding the shroud segment 122 and the shroud segment support unit 121 (operation 4). To this end, the worker prepares in advance the shroud segment 122 having a size suitable for a gap K (see FIG. 6) between the adjacent shroud segment support units 121, places the shroud segment 122 placed between the adjacent shroud segment support units 121, and performs the bonding process.

The bonding process according to the exemplary embodiment of FIGS. 8 and 9 is a laser welding process, which is described in detail.

As shown in FIG. 8, the worker places the shroud segment 122 between the adjacent shroud segment support units 121 by using a jig. Thereafter, the worker radiates a laser beam in a vertical downward direction while supplying a filter metal M.

The laser beam may be radiated by laser beam generation equipment LM (see FIG. 10) used in a common laser welder. The type of filler metal M is determined according to materials of the shroud segment support unit 121 and the shroud segment 122, and may be any of various filler metals for a low carbon steel, a low alloy steel, a stainless steel, a copper alloy, a cast iron, an aluminum, etc., or the same material as that of a usual welding rod.

If the laser beam is radiated, melting portions MP are generated by fusing the shroud segment support unit 121, the shroud segment 122, and the filler metal M by heat. The melting portions MP gradually grow, and as shown in FIG. 9, reach lower surfaces of the shroud segment support unit 121 and the shroud segment 122.

In this regard, in the exemplary embodiment, as described above, since the distance L1 from the protrusion direction center line O of the blade units 112 to the end portion 121a of the shroud segment support unit 121 is sufficiently greater than the distance L2 from the protrusion direction center line O of the blade units 112 to the end portion F1a of the first reinforcing unit F1, the melting portions MP do not negatively affect the first reinforcing unit F1, and thus the strength of the rotation part 100 is not affected.

If the melting portions MP sufficiently grow as shown in FIG. 9, the worker completely radiates the laser beam, cools the melting portions MP, forms the bonding line portion 120a, and ends a bonding operation.

The bonding process, as shown in FIG. 10, may be sequentially performed in a circumferential direction of the impeller 110. In this case, the bonding process may be performed by rotating the impeller 110 and changing a laser beam radiation direction of the laser beam generation equipment LM.

The bonding process according to the exemplary embodiment is a laser welding process, but the embodiment is not limited thereto. That is, there is no special limitation on a bonding method according to the exemplary embodiment. For example, the bonding process according to the exemplary embodiment may be any of various bonding processes such as electron beam welding, arc welding, gas welding, resistance welding, brazing processing, etc.

According to the exemplary embodiment, the process of placing the one shroud segment 122 between the two adjacent shroud segment support units 121 and then bonding the one shroud segment 122 to the two adjacent shroud segment support units 121 is performed separately for each of the shroud segments 122. That is, a placing process (operation 3) and the bonding process (operation 4) are performed for each of the shroud segments 122, but the exemplary embodiment is not limited thereto. That is, according to an exemplary embodiment, the process of concurrently placing and fixing the all shroud segments 122 between the shroud segment support units 121 (operation 3) and then the bonding process (operation 4) of concurrently bonding the shroud segments 122 and the shroud segment bonding units 121 may be performed.

According to the exemplary embodiment, no further processing is performed on a bonding portion after the above-described bonding process (operation 4) is performed, but the exemplary embodiment is not limited thereto. That is, if necessary, the worker may perform cutting processing or grinding processing on the bonding portion between the shroud segment support units 121 and the shroud segments 122 on which bonding processing is completed, in particular, at least a part of the bonding line portion 120a, thereby improving smoothness of a surface of the shroud 120 while adjusting a thickness of the shroud 120. Such an additional process may reduce a risk of eccentricity occurring during a rotational motion, thereby increasing a rotational stability of the rotation part 100.

As described above, the rotation part 100 of the rotation machine and the method of manufacturing the rotation part 100 according to the exemplary embodiment form the base unit 111, the blade units 122, the shroud segment support unit 121, the first reinforcing unit F1, and the second reinforcing unit F2 by performing cutting processing on the one raw material member S, thereby facilitating preparation and processing of materials. In particular, if the opening part U is formed in the intermediate part W through processing during the cutting processing, since various cutting tools may be injected through the opening part U, precise processing may be possible. If so, precise processing may be performed on the first reinforcing unit F1 and the second reinforcing unit F2 having sufficient thicknesses, and thus strength of the first reinforcing unit F1 and the second reinforcing unit F2 may be increased, and shapes of the first reinforcing unit F1 and the second reinforcing unit F2 may be formed to prevent stress concentration.

According to the rotation part 100 of the rotation machine and the method of manufacturing the rotation part 100 of the exemplary embodiment, when the shroud segment support units 121 and the shroud segments 122 are bonded to each other, the bonding portion and the first reinforcing unit F1 may be configured to be sufficiently spaced apart from each other such that the first reinforcing unit F1 may not be affected during the bonding process, thereby preventing strength of the rotation part 100 from weakening due to the bonding process.

A rotation part of a rotation machine and a method of manufacturing the rotation part according to an exemplary embodiment will now be described with reference to FIGS. 12 through 14 below. Differences between the previous exemplary embodiment and the present exemplary embodiment will be mainly described below.

Figure 12:
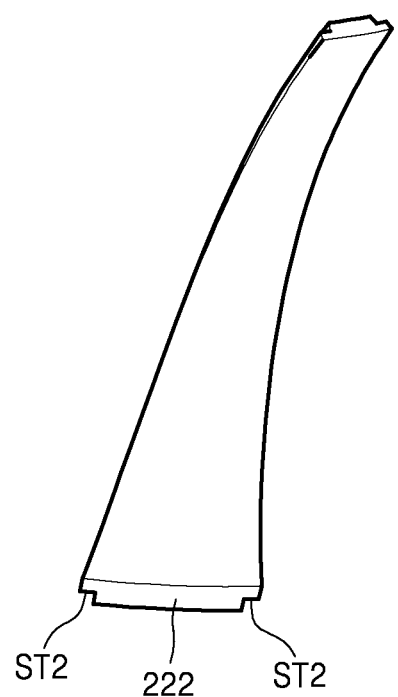
FIG. 12 is a perspective view of a shroud segment according to another exemplary embodiment.

FIG. 12 is a perspective view of a shroud segment 222 according to an exemplary embodiment. FIGS. 13 and 14 are schematic cross-sectional views for illustrating a process of bonding the shroud segment 222 to shroud segment support units 221 according to an exemplary embodiment.

A base unit 211, blade units 212, the shroud segment support units 221, and the shroud segment 222 of the rotation part of the rotation machine according to the exemplary embodiment are almost the same as the base unit 111, the blade units 112, the shroud segment support units 121, and the shroud segment 122 of the rotation part 100 in the above-described exemplary embodiment shown in FIGS. 5-7.

However, a coupling structure of the shroud segment support units 221 and the shroud segment 222 of the rotation part of the rotation machine according to the exemplary embodiment is different from that of the shroud segment support units 121 and the shroud segment 122 of the rotation part 100 of the above-described exemplary embodiment as shown in FIGS. 5-7.

Figure 13:
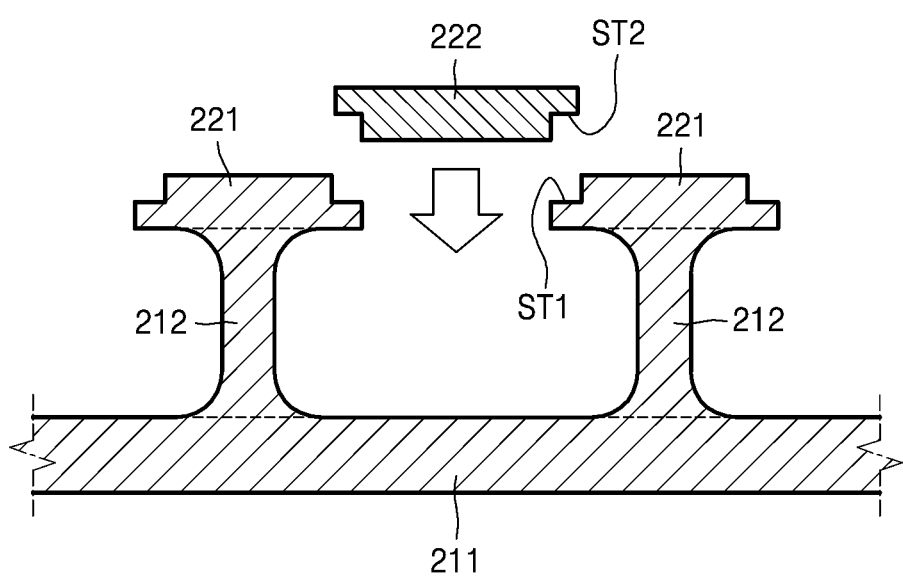
FIGS. 13 and 14 are schematic cross-sectional views for illustrating a process of bonding a shroud segment to shroud segment support units according to an exemplary embodiment.
Figure 14:
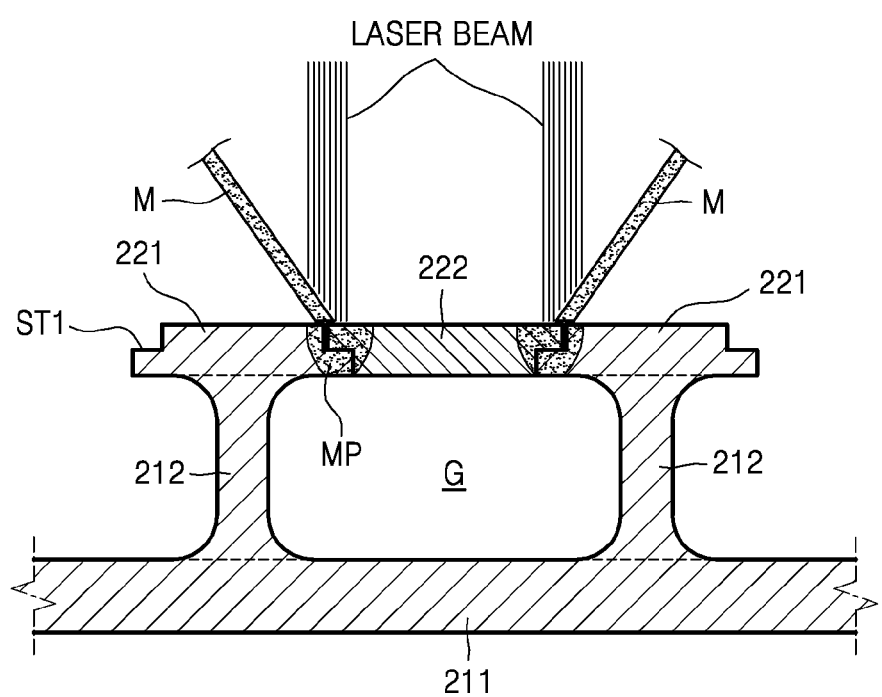

Specifically, as shown in FIGS. 12 and 13, a first step structure ST1 is formed in the shroud segment support units 221, and a second step structure ST2 connected to the first step structure ST1 is formed in the shroud segment 222.

As shown in FIG. 13, when the shroud segment 222 is fixed between the adjacent shroud segment support units 221, since the second step structure ST2 formed in the shroud segment 222 is placed on the first step structure ST1 formed in the shroud segment support units 221, fixing the second step structure ST2 is made easy, a work time and work costs are reduced, and a bonding process in a next step may be easily performed.

The first step structure ST1 formed in the shroud segment support units 221 of the rotation part of the exemplary embodiment has a shape of one step, and the second step structure ST2 formed in the shroud segment 222 has also a shape of one step, but the exemplary embodiment is not limited thereto. For example, the first step structure ST1 and the second step structure ST2 may respectively have a shape of a plurality of steps such as two steps, three steps, etc., and or may have planar and curved shapes.

The configuration, operation, and effect of the rotation part of the rotation machine and the method of manufacturing the rotation part according to the exemplary embodiment, in addition to the configuration, operation, and effect described above, are the same as those of the rotation part 100 of the rotation machine and the method of manufacturing the rotation part 100 according to the previous exemplary embodiment, and thus descriptions thereof are omitted here.

As described above, according to the one or more of the above exemplary embodiments, a rotation part of a rotary machine may have excellent strength.

It should be understood that the exemplary embodiments described therein should be considered in a descriptive sense only and not for purposes of limitation. Descriptions of features or aspects within each exemplary embodiment should typically be considered as available for other similar features or aspects in other exemplary embodiments.

While exemplary embodiments have been particularly shown and described above, it will be understood by those of ordinary skill in the art that various changes in form and details may be made therein without departing from the spirit and scope of the present inventive concept as defined by the following claims.

What is claimed is:

1. A method of manufacturing a rotation part of a rotary machine, the method comprising:
preparing a raw material member;
lathing processing the raw material member to form a first-cut raw material member including an upper part and an intermediate part;
end milling processing the first-cut raw material member to form a base unit having a surface constituting fluid channels, a plurality of blade units protruding from the base unit, and a plurality of shroud segment support units connected to the plurality of blade units and extending in a parallel direction to the surface of the base unit;
end mill processing the plurality of blade units and the plurality of shroud segment support units to form a first reinforcing unit on an intersection portion between the plurality of blade units and the plurality of shroud segment support units;
placing a shroud segment between adjacent shroud segment support units of the plurality of shroud segment support units; and
bonding the shroud segment and the adjacent shroud segment support units,
wherein the end milling processing the first-cut raw material member comprises:
cutting an opening part in the intermediate part; and
cutting the intermediate part through the opening part to form the plurality of blade units protruding form the base unit and the plurality of shroud segment support units extending in the parallel direction to the surface of the base unit.

2. The method of claim 1, wherein the rotary machine comprises a compressor or a pump.

3. The method of claim 1, wherein the raw material member has a cylindrical shape.

4. The method of claim 1, wherein the raw material member comprises forging steel.

5. The method of claim 1, wherein the forming the first reinforcing unit comprises forming a surface of the first reinforcing unit with a curved shape.

6. The method of claim 1, wherein the forming the first reinforcing unit comprises forming the first reinforcing unit having a cross section of a triangular shape.

7. The method of claim 1, wherein the processing the raw material member comprises forming a second reinforcing unit on an intersection portion between the base unit and the plurality of blade units.

8. The method of claim 1, wherein the bonding the plurality of shroud segment support units and the shroud segment comprises at least one of laser welding, electron beam welding, arc welding, gas welding, resistance welding and brazing.

9. The method of claim 1, further comprising, after the bonding, performing cutting processing or grinding processing on a bonding part of the plurality of shroud segment support units and the shroud segment.

10. The method of claim 1, wherein a distance from a protruding direction center line of a blade unit of the plurality of blade units to an end portion of a shroud segment support unit of the plurality of shroud segment support units is greater that a maximum distance from the protruding direction center line of the blade unit to an end portion of the first reinforcing unit.

11. The method of claim 10, wherein a distance difference between the distance from the protruding direction center line of the blade unit to the end portion of the shroud segment support unit and the maximum distance from the protruding direction center line of the blade unit to the end portion of the first reinforcing unit is configured to be greater than a predetermined value to prevent the first reinforcing unit from being thermally affected during the bonding the shroud segment and the adjacent shroud segment support units.

12. The method of claim 1, wherein the processing the raw material member comprises forming a first step structure in the plurality of shroud segment support units, and further comprises forming a second step structure in the shroud segment, the second step structure connected to the first step structure.

13. The method of claim 12, wherein each of the first step structure and the second step structure comprises a plurality of steps.

* * * * *